(12) United States Patent  
Hopkins

(10) Patent No.: US 7,997,549 B2
(45) Date of Patent: Aug. 16, 2011

(54) MOUNTING BRACKET FOR AN ELECTRICAL JUNCTION BOX

(75) Inventor: Larry D. Hopkins, Oklahoma City, OK (US)

(73) Assignee: Larry D. Hopkins, Trustree, Oklahoma City, OK (US)

( * ) Notice: Subject to any disclaimer, the term of this patent is extended or adjusted under 35 U.S.C. 154(b) by 278 days.

(21) Appl. No.: 12/437,314

(22) Filed: May 7, 2009

(65) Prior Publication Data

US 2010/0282936 A1 Nov. 11, 2010

(51) Int. Cl.
*A47B 96/06* (2006.01)
(52) U.S. Cl. ........... 248/220.41; 248/309.1; 248/220.22; 174/480; 174/503
(58) Field of Classification Search ............ 248/220.41, 248/220.31, 220.22, 220.21, 309.1, 304, 248/339; 403/345, 335, 341; 174/480, 503
See application file for complete search history.

(56) References Cited

U.S. PATENT DOCUMENTS

| 5,405,111 | A   | * | 4/1995  | Medlin, Jr. | 248/205.1 |
| 6,315,489 | B1  | * | 11/2001 | Watanabe    | 403/381   |
| 7,210,661 | B1  | * | 5/2007  | Jentzsch    | 248/220.41|
| 2004/0074196 | A1 | * | 4/2004 | Saladana    | 52/712    |
| 2006/0237601 | A1 | * | 10/2006 | Rinderer   | 248/200.1 |
| 2010/0282933 | A1 | * | 11/2010 | Phillips   | 248/218.4 |

* cited by examiner

*Primary Examiner* — Terrell McKinnon
*Assistant Examiner* — Todd M. Epps
(74) *Attorney, Agent, or Firm* — Dunlap Codding, P.C.

(57) ABSTRACT

A mounting bracket for installing an electrical junction box to an R-panel, the mounting bracket comprising a mounting plate having a first surface for interfacing with a portion of the housing of the electrical junction box, one or more sidewalls extending from the mounting plate; and one or more attachment tabs extending laterally from each of the sidewalls, wherein the mounting bracket is positioned between R-panel and the electrical junction box to space the electrical junction box at a distance away from the R-panel such that the electrical conduit may interface with the electrical junction box without having to bend the electrical conduit.

19 Claims, 5 Drawing Sheets

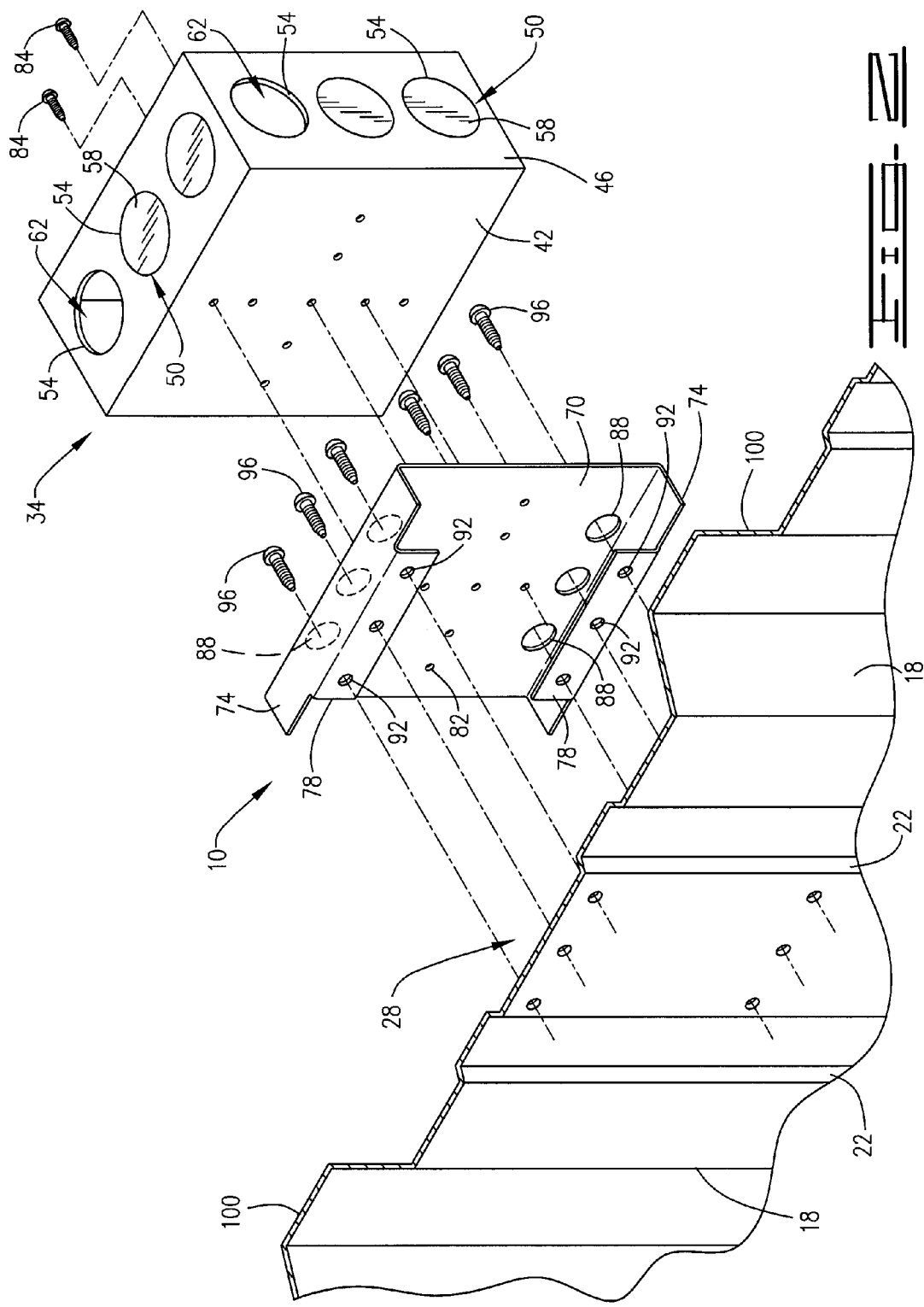

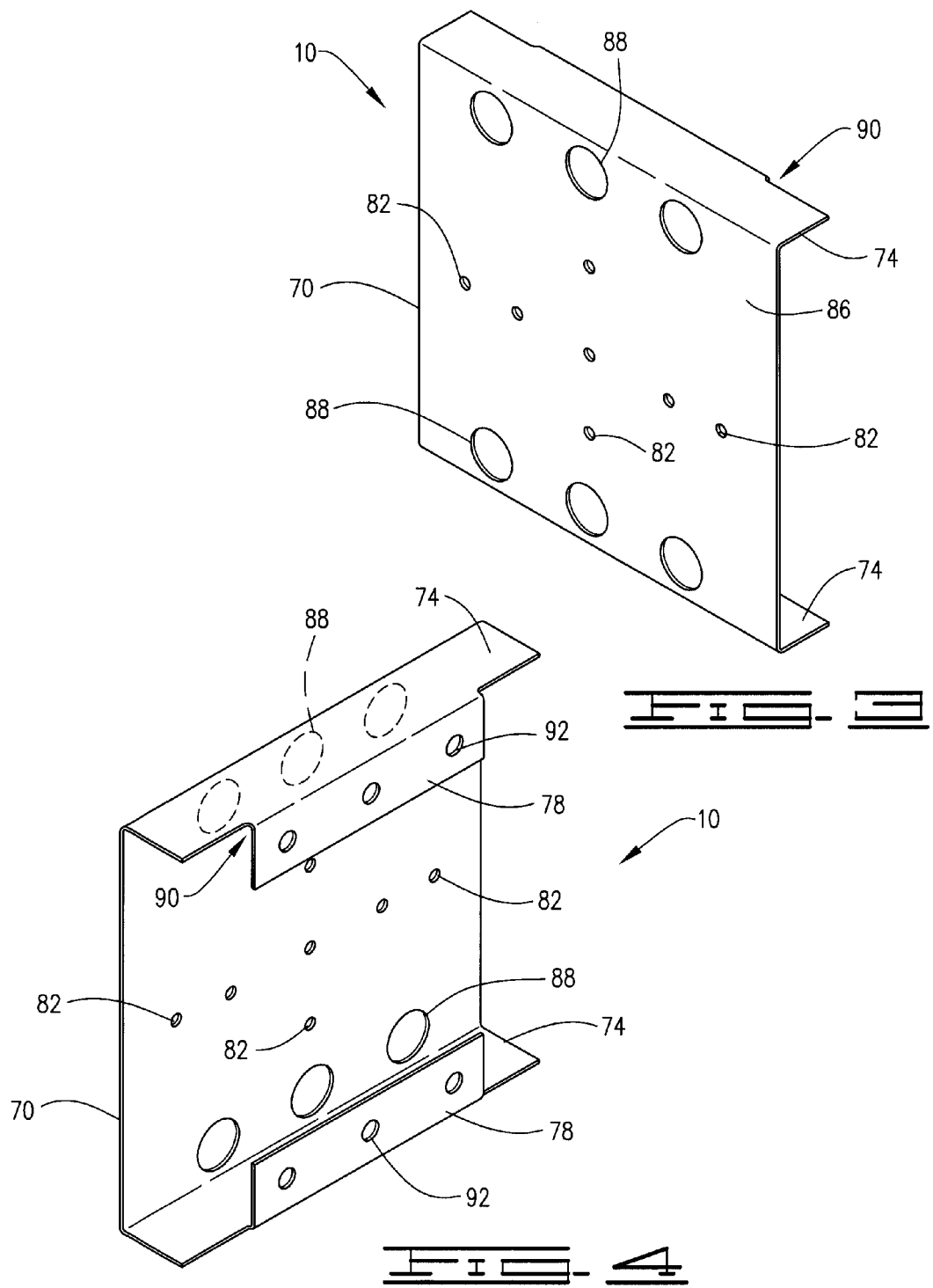

US 7,997,549 B2

MOUNTING BRACKET FOR AN ELECTRICAL JUNCTION BOX

BACKGROUND OF THE INVENTION

1. Field of the Invention

This invention relates to a mounting bracket, and more particularly, but not by way of limitation, to a mounting bracket for connecting electrical junction boxes to an R-panel of an R-panel wall.

2. Brief Description of Related Art

The installation and use of electrical junction boxes is well known in the art, particularly in applications where the electrical junction boxes are used in combination with tubular metallic conduits which carry electrical conductor lines. While the installation of electrical junction boxes is well known, some applications require the bending of the metallic electrical conduits, for example the installation of electrical junction boxes along R-panel walls.

R-panels are commonly used in the construction of walls or roofs. R-panels are ideal for metal buildings, light commercial structures, and modular buildings. In general, an R-panel is fabricated from a piece of sheet metal that is shaped to form a panel having a series of alternating long and short ribs which function to enhance the strength of the R-panel. The edges of the R-panel are fabricated to mate with the edges of adjacent R-panels in an overlapping fashion to form an R-panel wall or roof. The R-panels are fastened to a substrate, for example, the exterior panels of a structure, the decking on a roof and the like.

After the R-panels are installed, electrical junction boxes are typically installed between two of the long ribs of the R-panel. Because the metallic electrical conduits run along the face of the long ribs and the electrical junction boxes are positioned between the long ribs such that they are somewhat recessed between the long ribs, the metallic electrical conduits must be bent in order to interface with the electrical junction boxes. Typical metallic electrical conduits include Rigid, IMC, and EMT which can all be difficult to shape, thus bending the metallic electrical conduits can be a costly and time-intensive process. In fact, specialized tools are needed to form the intricate bends and curves needed to shape such electrical conduits.

Therefore, a need exists for a mounting bracket which allows electrical junction boxes installed between the long ribs of an R-panel to be spaced from the R-panel a distance away from the R-panel which reduces the need for bending the metallic electrical conduits to join them with the electrical junction boxes. It is to such a mounting bracket that the present invention is directed.

BRIEF DESCRIPTION OF THE SEVERAL VIEWS OF THE DRAWINGS

FIG. 2 is an exploded perspective view of the mounting bracket, electrical junction box and R-panel.

FIG. 3 is a front perspective view of a mounting bracket.

FIG. 4 is a rear perspective view of the mounting bracket of FIGS. 1-3.

DETAILED DESCRIPTION OF EXEMPLARY EMBODIMENT

Figure 1:
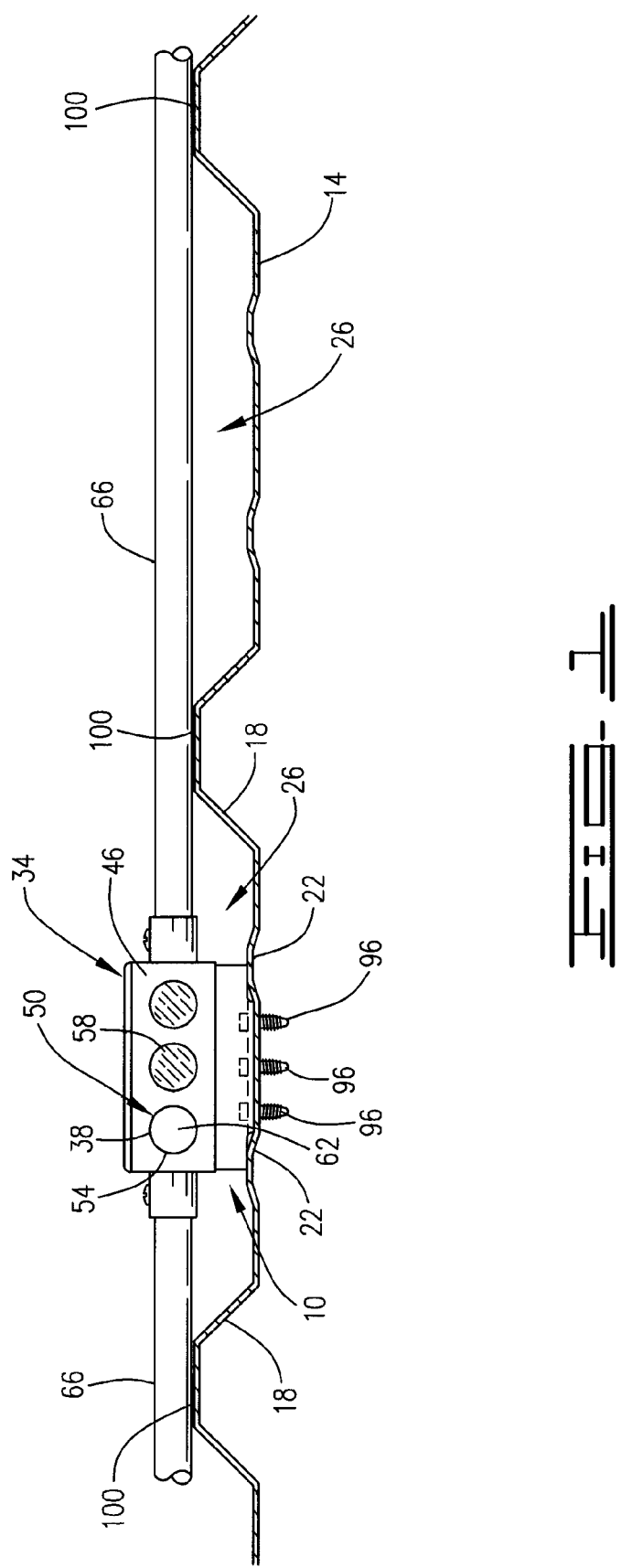
FIG. 1 is a top plan view of a mounting bracket in combination with an electrical junction box and electrical conduits, the bracket being secured to an R-panel, in accordance with the present invention.
Figure 5A:
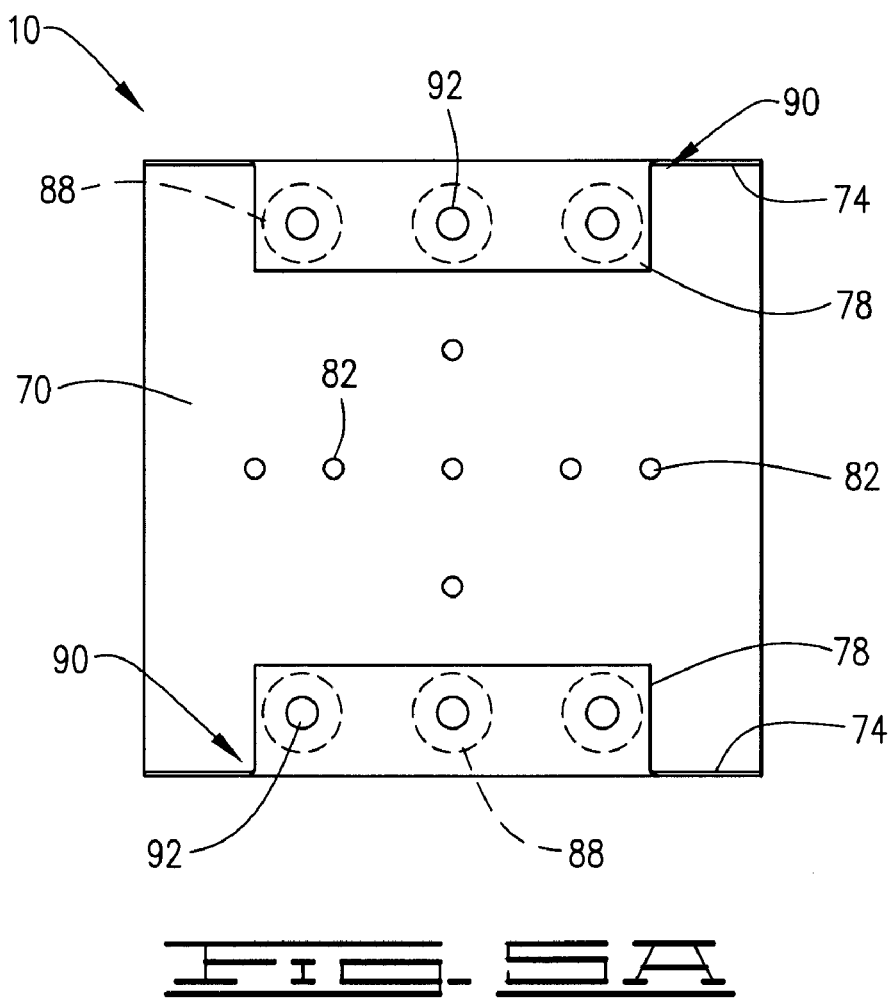
FIG. 5A is a rear elevation view of the mounting bracket of FIGS. 1-4.
Figure 5B:
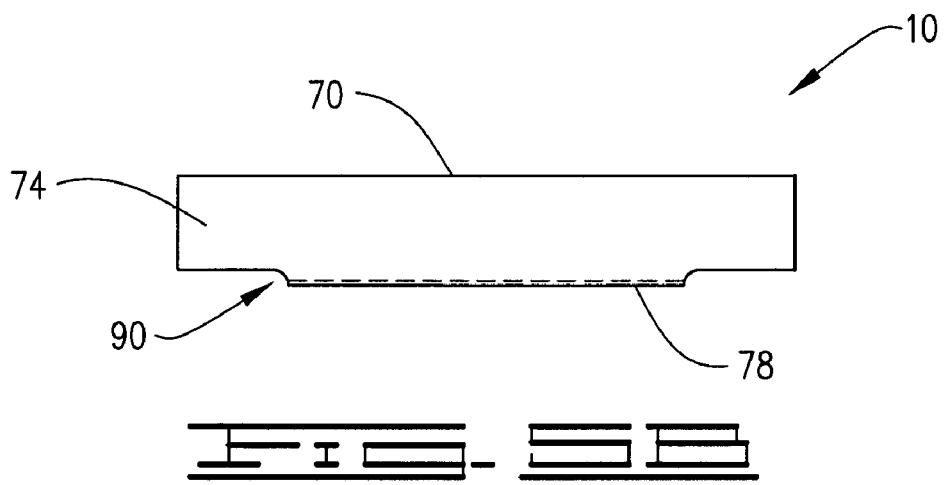
FIG. 5B is a side elevation view of the mounting bracket of FIGS. 1-5A.
Figure 5C:
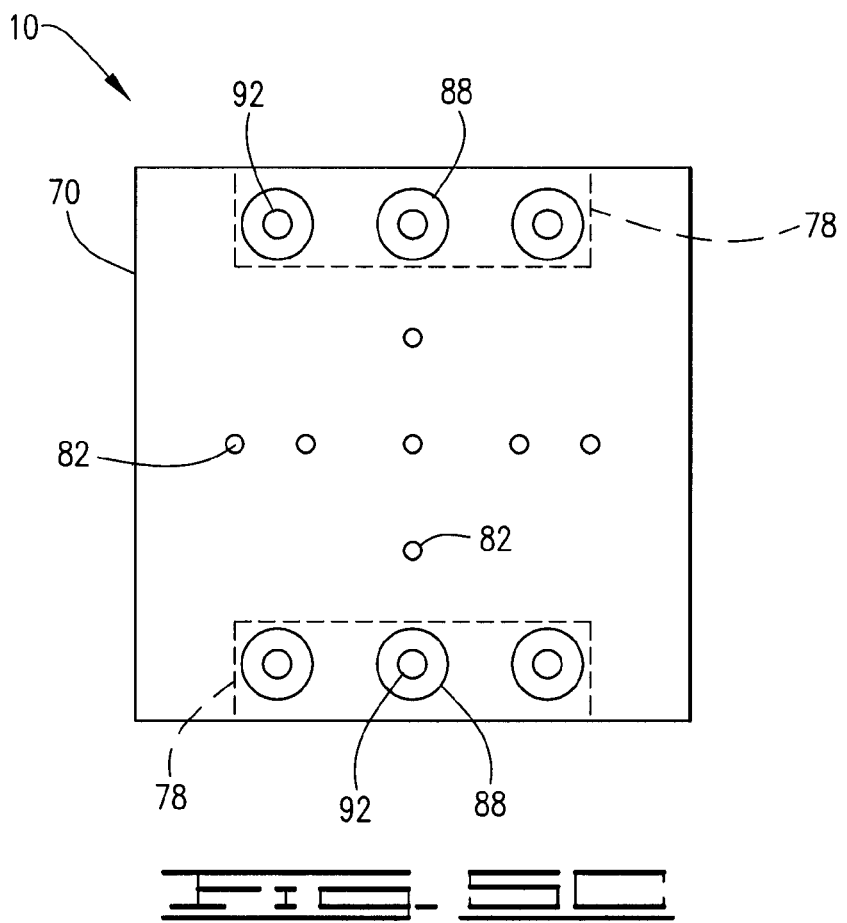
FIG. 5C is a front elevation view of the mounting bracket of FIGS. 1-5B.
Figure 5D:
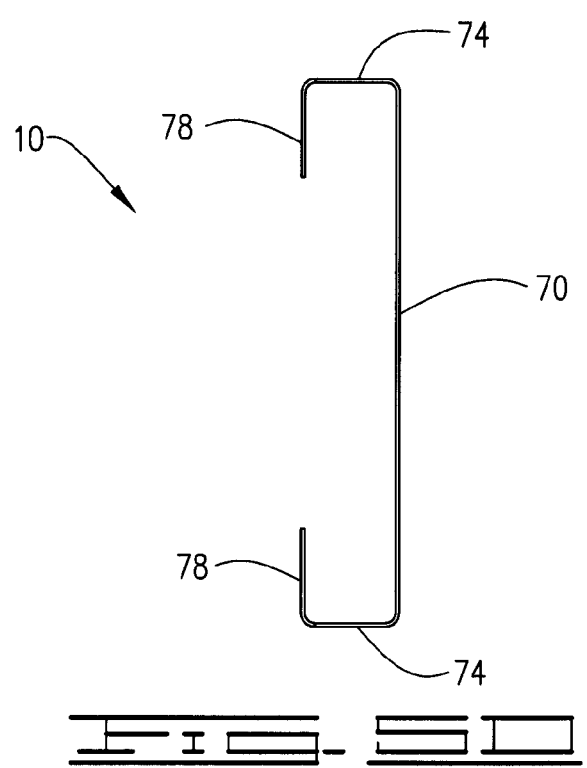
FIG. 5D is a top plan view of the mounting bracket of FIGS. 1-5C.

Referring now to the drawings and, more particularly to FIGS. 1 and 2 collectively, shown therein is a mounting bracket, hereinafter referred to as the bracket 10, installed along an R-panel 14 of a wall. The wall is formed by joining together a plurality of R-panels 14. Each of the R-panels 14 is formed from a sheet of metal and is fabricated with a plurality of alternating long and short ribs 18 and 22. The ribs 18 and 22 provided structural rigidity to the R-panels 14. The long ribs 18 cooperate to define a recess 26 in between the long ribs 18, and the short ribs 22 are located between the long ribs 18 within the recess 26. The short ribs 22 also cooperate to define a recess 28 located between the short ribs 22. In one embodiment, the R-panel 14 is formed having two short ribs 22 between each of the long ribs 18, although it will be apparent that any number of different rib configurations that would be known to one of ordinary skill in the art are likewise contemplated for use in accordance with the present invention. It will be understood that the R-panel 14 may optionally only include long ribs 18. Each of the R-panels 14 is secured to a substrate (not shown) by one or more fasteners. The substrate may be any vertical or horizontal surface, for example, the framing studs of a building. The fasteners used in securing the R-panels 14 to the substrate may include threaded fasteners, rivets, clips and the like.

One or more electrical junction boxes 34 may be connected to the R-panel 14. Each of the electrical junction boxes 34 includes a housing 38 fabricated from a strong and rigid material such as a polymer, composite, fiberglass, titanium, alloy, carbon fiber (including carbon nanotube materials), any other suitably durable material, or any combinations thereof. In one embodiment, the housing 38 is provided with a base plate 42 and a sidewall 46 extending from the base plate 42. The sidewall 46 may include one or more punch outs 50 constructed by fabricating circumferential score lines 54 into the sidewall 46. The score lines 54 outline a blank 58 which may be "punched out" to reveal an opening. For example, when the punch outs 50 are impacted by a force such as when the punch outs 50 are hit with a hammer, the blank 58 separates along the score line 54 leaving an aperture 62 for receiving at least a portion of an electrical conduit 66 therethrough.

Typically, the electrical junction box 34 is attached to the R-panel 14 by positioning the electrical junction box 34 in the recess 26 between two of the long ribs 18. As such, the electrical conduits 66 must be bent to correspond to the contours of the R-panel 14. Such bending and shaping of the electrical conduits 66 is a costly and time intensive procedure.

Referring now to FIGS. 2-5D collectively, to reduce and/or substantially eliminate the need for bending and shaping of the electrical conduits 66, the bracket 10 is positioned between the R-panel 14 and the electrical junction box 34. The bracket 10 is constructed from a strong and rigid material such as a metal, resin or hard plastic polymer, natural material(s) such as a wood or fiber based material, metal (such as steel, titanium, aluminum or blends thereof), fiber or glass based materials and combinations thereof. The bracket 10 is provided as a single piece of metal shaped to form a mounting plate 70 having sidewalls 74 and attachment tabs 78, although it will be understood that the bracket 10 may likewise be constructed from separate pieces.

The mounting plate 70 is sized to receive and join with the electrical junction box 34 via a plurality of apertures 82 each sized to receive a fastener 84. The position and spacing of the apertures 82 allows the electrical junction box 34 to be variably positioned with respect to the mounting plate 70 such that the electrical junction box 34 may be adjusted vertically or horizontally according to installation requirements. The fasteners 84 may include threaded fasteners, pins, bolts, clips and the like which would be known to one of ordinary skill in the art with the present disclosure before them. In one embodiment, the mounting plate 70 includes a first surface 86 configured to mate with a back surface of the electrical junction box 34. The mounting plate 70 is also provided with a plurality of enlarged apertures 88 fabricated into the edges of the mounting plate 70. The enlarged apertures 88 provide access to portions of the attachment tabs 78 as will be discussed in greater detail below. The enlarged apertures 88 are constructed such that a portion of a tool, for example the end of a screwdriver may be inserted through the enlarged apertures 88.

The sidewalls 74 of the bracket extend from the edges of the mounting plate 70. The length of the sidewalls 74 along with the thickness of the material of the mounting plate 70 and the attachment tabs 78 determines how far the bracket 10 spaces the electrical junction box 34 away from the R-panel 14. Therefore, the longer the sidewalls 74, the farther the electrical junction box 34 will be spaced away from the R-panel 14. The length of the sidewalls 74 will therefore depend on the specific dimensional aspects of the R-panel 14, most notably the difference in lengths between the long 18 and short ribs 22.

The attachment tabs 78 are substantially rectangular plates that extend inwardly from the sidewalls 74 and may be positioned substantially parallel to the mounting plate 70. The attachment tabs 78 are at least partially offset from the edge of the sidewalls 74 such that they curve inwardly slightly below the edge of the sidewalls 74. The attachment tabs 78 and sidewalls 74 cooperate to form a pair of notched portions 90. The shape of the notched portions 90 at least partially corresponds to the profile of approximately one half of one of the short ribs 22 such that when the bracket 10 is positioned between two of the short ribs 22, the bracket 10 substantially corresponds to a portion of the profile of the R-panel 14. More specifically, each of the notched portions 90 can cover at least a portion or all of one of the short ribs 22 and the attachment tabs 78 mate flush with the face of the R-panel 14 in the recess 28 between the short ribs 22. Positioning the bracket 10 between two of the short ribs 22 reduces the tendency for the bracket to move laterally along the R-panel 14.

The attachment tabs 78 include one or more apertures 92, each fabricated to receive a fastener 96 for securing the bracket 10 to the recess 28 between two short ribs 22 of the R-panel 14. The fasteners 96 may include threaded fasteners, pins, bolts, clips and the like which would be known to one of ordinary skill in the art with the present disclosure before them. The enlarged apertures 88 of the mounting plate 70 are disposed in axial alignment with the apertures 92 of the attachment tabs 78 to provide access to the apertures 92 of the attachment tabs 78 such that fasteners 96 may be passed through the enlarged apertures 88 to engage with the apertures 92 and secure the bracket 10 between two of the short ribs 22 of the R-panel.

The bracket 10 should be sized such that when the electrical junction box 34 is attached to the bracket 10 which is in turn connected to the R-panel 14, the electrical conduits 66 which run along the faces 100 of the long ribs 18 are able to interface with electrical junction box 34 without having to bend the electrical conduits 66 to interface with the electrical junction box 34.

In operation, the electrical junction boxes 34 are installed along the R-panel 14 between two of the short ribs 22 of the R-panel 14 by fastening the bracket 10 to the R-panel 14 via fasteners 96 threaded through the apertures 92 of the attachment tabs 78. In one embodiment, the attachment tabs 78 are disposed within the recess 28 between the short ribs 22 of the R-panel 14 such that the notched portions 90 of the bracket 10 overlap and substantially conform to a portion of the each of the short ribs 22.

Once the bracket 10 is secured between the two short ribs 22 of the R-panel 14, the punch outs 50 of the electrical junction box 34 are depressed to remove the blanks 58 in order to reveal the apertures 62 for receiving the electrical conduits 66. Next, the electrical junction box 34 is secured to the mounting plate 70 of the bracket 10 via fasteners 84. After the electrical junction box 34 is secured to the bracket 10, the electrical conduits 66 are fed through the apertures 62 of the punch outs 50 and the ends of the electrical conduits 66 are securely connected to the housing 38 of the electrical junction box 34.

It will be understood that although the bracket 10 has been disclosed as being disposed within the recess 28 between the short ribs 22 of the R-panel 14, the bracket 10 may be disposed at any position along the R-panel 14 so long as the electrical conduits 66 can interface with the electrical junction box 34 in such a way that the electrical conduits 66 remain in an unbent state.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A mounting bracket for installing an electrical junction box to an R-panel, the R-panel having a plurality of ribs defining recesses therebetween, the electrical junction box having a housing configured to receive at least a portion of an electrical conduit therein, the bracket comprising:

a mounting plate having a first surface for interfacing with a portion of the housing of the electrical junction box;

one or more sidewalls extending from the mounting plate; and one or more attachment tabs extending laterally from each of the sidewalls, the attachment tabs oriented substantially parallel to the mounting plate, the attachment tabs being connectable to the R-panel;

wherein the mounting bracket is positionable within a recess between two of the ribs of the R-panel and between the R-panel and the electrical junction box to space the electrical junction box at a distance away from the R-panel such that electrical conduits may interface with the electrical junction box in an unbent state.

2. The mounting bracket of claim 1, wherein the mounting plate includes one or more enlarged apertures fabricated along one or more of the sides of the mounting plate.

3. The mounting bracket of claim 2, wherein each of the attachment tabs includes one or more apertures disposed in axial alignment with the enlarged apertures of the mounting plate, the apertures configured to receive a fastener for securing the bracket to the R-panel.

4. The mounting bracket of claim 1, wherein the mounting bracket includes one attachment tab at least partially offset from each of the sidewalls to form two notched portions that each substantially conform to a portion of a rib of the R-panel such that when the mounting bracket is disposed in the recess between two ribs of the R-panel a portion of the mounting bracket substantially conforms to a portion of an outer surface of the R-panel.

5. An electrical junction box in combination with a mounting bracket for installing the electrical junction box to an R-panel wall, the electrical junction box including a housing having a base and a sidewall extending therefrom, the sidewall of the electrical junction box configured to receive at least a portion of an electrical conduit, the R-panel having a plurality of ribs defining recesses therebetween, the mounting bracket comprising:
 a mounting plate having a first surface for interfacing with a portion of the housing of the electrical junction box;
 one or more sidewalls extending from the mounting plate; and
 one or more attachment tabs extending laterally from each of the sidewalls, the attachment tabs oriented substantially parallel to the mounting plate, the attachment tabs being connectable to the R-panel;
 wherein the mounting bracket is positionable within a recess between two of the ribs of the R-panel and between the R-panel and the electrical junction box to space the electrical junction box at a distance away from the R-panel such that the electrical conduits may interface with the electrical junction box in an unbent state.

6. The combination of claim 5, wherein the mounting plate includes one or more enlarged apertures fabricated along one or more of the sides of the mounting plate.

7. The combination of claim 6, wherein each of the attachment tabs includes one or more apertures disposed in axial alignment with the enlarged apertures of the mounting plate, the apertures configured to receive a fastener for securing the bracket to the R-panel.

8. The combination of claim 5, wherein the mounting bracket includes one attachment tab at least partially offset from each of the sidewalls to form two notched portions that each substantially conform to a portion of a rib of the R-panel such that when the mounting bracket is disposed in the recess between two ribs of the R-panel a portion of the mounting bracket substantially conforms to a portion of an outer surface of the R-panel.

9. An improved R-panel comprising a panel formed having a plurality of ribs defining recesses in between the ribs, the improvement comprising:
 a mounting bracket for spacing an electrical junction box at a distance away from the R-panel such that the electrical conduits may interface with the electrical junction box in an unbent state, the mounting bracket including:
 a mounting plate having a first surface for interfacing with an electrical junction box;
 one or more sidewalls extending from the mounting plate; and
 one or more attachment tabs extending laterally from each of the sidewalls, the attachment tabs oriented substantially parallel to the mounting plate, the attachment tabs being connected to the R-panel;
 wherein the mounting bracket is positioned within a recess between two of the ribs of the R-panel and between the R-panel and the electrical junction box.

10. The improved R-panel of claim 9, wherein the mounting plate includes one or more enlarged apertures fabricated along one or more of the sides of the mounting plate.

11. The improved R-panel of claim 10, wherein each of the attachment tabs includes one or more apertures disposed in axial alignment with the enlarged apertures of the mounting plate, the apertures configured to receive a fastener for securing the bracket to the R-panel.

12. The improved R-panel of claim 9, wherein the R-panel includes two long ribs with two short ribs positioned in between the two long ribs, and the bracket is positioned between the two long ribs and each of the attachment tabs is attached to one of the short ribs.

13. The improved R-panel of claim 12, wherein the two short ribs are spaced a distance apart and the attachment tabs of the mounting bracket are spaced at a distance substantially equal to the distance that the short ribs are spaced.

14. The improved R-panel of claim 12, wherein the mounting bracket includes one attachment tab at least partially offset from each of the sidewalls to form two notched portions that each substantially conform to a portion of a rib of the R-panel such that when the mounting bracket is disposed in the recess between two ribs of the R-panel a portion of the mounting bracket substantially conforms to a portion of an outer surface of the R-panel.

15. A method for installing electrical junction boxes to an R-panel wall, the R-panel wall having a plurality of ribs defining recesses in between the ribs, the method comprising the steps of:
 securing a mounting bracket to the R-panel in a recess between two of the ribs of the R-panel, the mounting bracket including:
 a mounting plate having a first surface for interfacing with an electrical junction box;
 one or more sidewalls extending from the mounting plate; and
 one or more attachment tabs extending laterally from each of the sidewalls, the attachment tabs oriented substantially parallel to the mounting plate, the attachment tabs being connectable to the R-panel;
 wherein the mounting bracket is positionable within a recess between two of the ribs of the R-panel and between the R-panel and the electrical junction box to space the electrical junction box at a distance away from the R-panel such that the electrical conduits may interface with the electrical junction box in an unbent state;
 securing the electrical junction box to the mounting plate of the mounting bracket; and
 connecting an electrical conduit to the electrical junction box without bending the electrical conduit.

16. The method of claim 15, wherein the mounting plate includes one or more enlarged apertures fabricated along one or more of the sides of the mounting plate.

17. The method of claim 16, wherein each of the attachment tabs includes one or more apertures disposed in axial alignment with the enlarged apertures of the mounting plate, the apertures configured to receive a fastener for securing the bracket to the R-panel.

18. The method of claim 15, wherein the R-panel includes two long ribs with two short ribs positioned in between the two long ribs, and the bracket is positioned between the two long ribs and each of the attachment tabs is attached to one of the short ribs.

19. The method of claim 15, wherein the mounting bracket includes one attachment tab at least partially offset from each of the sidewalls to form two notched portions that each substantially conform to a portion of a rib of the R-panel such that when the mounting bracket is disposed in the recess between two ribs of the R-panel a portion of the mounting bracket substantially conforms to a portion of an outer surface of the R-panel.

* * * * *